May 26, 1959 G. M. FARRELL ET AL 2,888,625
REMOTE TELEVISION TUNER
Filed July 30, 1957 3 Sheets-Sheet 1
FIG. 1
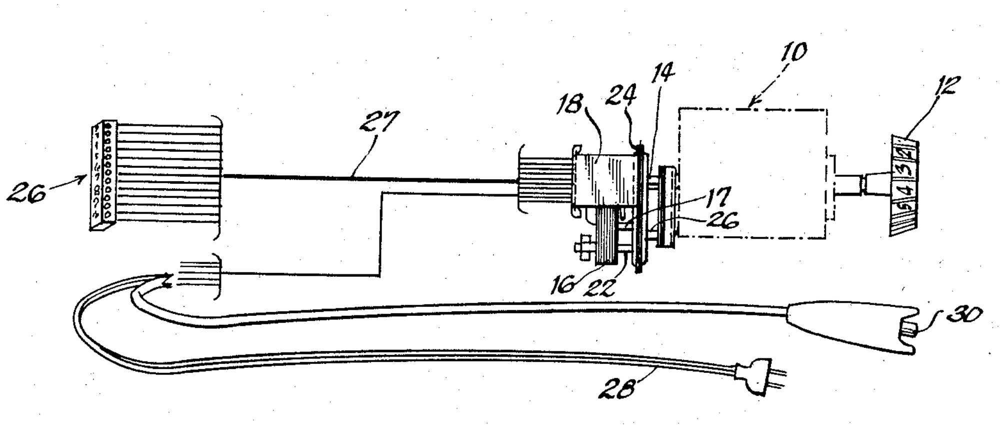
FIG. 2
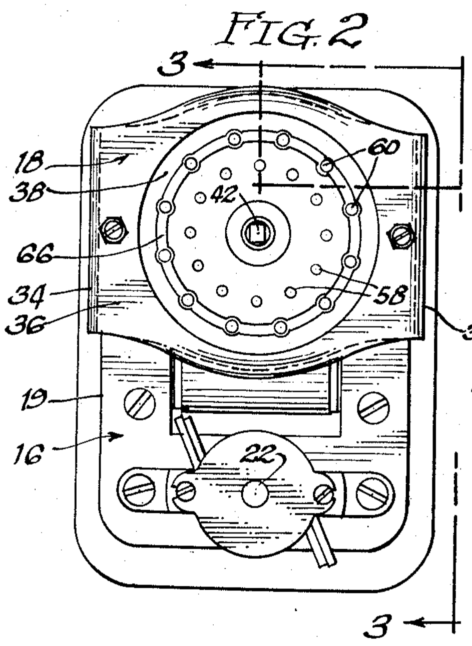
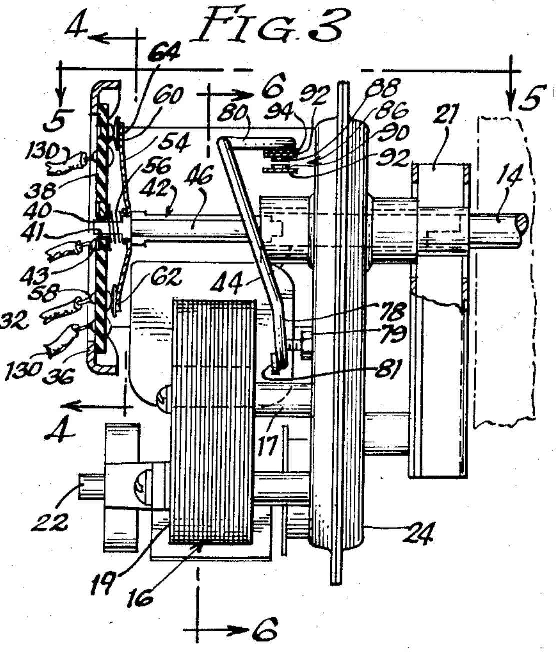
INVENTORS
Guy M. Farrell
BY Abe D. Frumhoff
Ooms, McDougall, Williams & Hersh
Attorneys May 26, 1959 G. M. FARRELL ET AL 2,888,625

REMOTE TELEVISION TUNER

Filed July 30, 1957 3 Sheets-Sheet 2

INVENTORS
Guy M. Farrell
Abe D. Frumhoff
BY
Orris, McDougall, Williams & Hersh
Attorneys May 26, 1959 G. M. FARRELL ET AL 2,888,625

REMOTE TELEVISION TUNER

Filed July 30, 1957 3 Sheets-Sheet 3

INVENTORS
Guy M. Farrell
BY Abe D. Frumhoff
Oons, McDougall, Williams & Hersh
Attorneys 2,888,625

REMOTE TELEVISION TUNER

Guy M. Farrell, Elmhurst, and Abe D. Frumhoff, Chicago, Ill., assignors to F & F Enterprises, Inc., Chicago, Ill., a corporation of Illinois Application July 30, 1957, Serial No. 675,187
15 Claims. (Cl. 318—467)

This invention relates to a television tuner, and more particularly to a remote control attachment for a television tuner.

Remote control attachments for television sets are growing in popularity for home use for the comfort and convenience of the viewer. They are also becoming more widely used in public places and institutions where the television sets are mounted in some inconvenient locations such as the upper corner of a room, or where it is not desirable for casual patrons or inexperienced persons to operate the set.

Remote control attachments previously constructed were objectionable for several reasons. First of all, they were complicated and expensive and were liable to frequent breakdowns. When they did break down, the cost of repair was high. They were expensive to install and their installation frequently involved a substantial modification of the entire television set. Frequently they depended upon the smooth functioning of other components of the set. This meant that a defect anywhere in the set would affect the remote control mechanism, and this would make the problem of determining the trouble more difficult and expensive. Some of these remote control attachments required the constant supervision of an operator while the set was changing stations, and these attachments were often bulky and obstructed access to other television controls or to television components which might need repair or adjustment.

These prior remote control attachments had other limitations. They were not provided with means for conveniently excluding undesirable programs and stations. This would be useful in the home where parents are interested in supervising the viewing habits of their children and it would be particularly useful in institutions which must control the entertainment of the inmates. The problem of station and program control in such institutions which have large numbers of television sets is particularly burdensome since it requires the time and attention of paid employees to be spent in frequently changing the stations on these sets to conform to the institution's requirements. It would be desirable if all these sets could be tuned at the same time, but prior remote control attachments did not lend themselves to simultaneous tuning.

Additionally, previous remote control attachments required a certain degree of coordination and skill by the operator but many people who are invalids, or who have physical handicaps, do not have the requisite ability to even grasp a knob. Such people require a remote control attachment which is automatic and which can be operated by using only a minimal amount of effort and skill. What is needed, therefore, and comprises the chief object of this invention, is an inexpensive remote control attachment for a television tuner which is automatic and which is very simple to operate.

A further object of this invention is to provide a remote control attachment which can be installed without an extensive modification of the television set.

Yet another object of this invention is to provide a remote control attachment which is not affected by defects in other components of the television set.

Yet another object of this invention is to provide a remote control attachment for a television tuner which can be easily adjusted to exclude undesirable stations.

Still another object of this invention is to provide a remote control attachment for a television set which can be easily adjusted and automatically tuned to television stations in different geographical locations.

Another object of this invention is to provide a remote control attachment for a television tuner which does not interfere with manual operation of the television set.

A further object of the invention is to provide a remote control attachment for a television tuner which becomes automatically disconnected from the television set after use, to permit manual operation.

Another object of this invention is to provide a remote control attachment for a television set which can be adjusted to eliminate manual operation of the set.

A further object of this invention is to provide an apparatus for connecting a source of electric current to a conductive wiper rotating on a non-conductive shaft.

Yet a further object of this invention is to provide a remote control attachment for a television set which is compact and which does not interfere with other television controls or obstruct access to other television components.

Another object of this invention is to provide a remote control attachment for a television set which is simple to make and durable.

These and other objects of this invention will become more apparent when read in the light of the accompanying drawings and specification wherein—

Figure 1 is a side elevation of the television tuner combined with the attached remote control mechanism;

Figure 2 is a rear elevation of the housing for a part of the remote control mechanism disclosing the rear portion of a rotary switch;

Figure 3 is a sectional view taken on the line 3—3 of Figure 2 and showing the electric motor mounted inside the housing and its connection with the tuner shaft;

Figure 4:
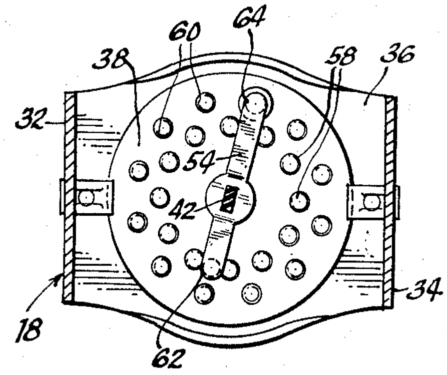
Figure 4 is a sectional view taken on the line 4—4 of Figure 3 showing other details of the rotary switch.

Referring now to Figure 1 of the drawings, a conventional tuner for a television set indicated generally as 10 has a manually operated tuning knob 12. This tuning knob is connected to a tuning shaft 14 which extends through the tuner. The tuning shaft is rotatable through a plurality of predetermined positions, some of which correspond to the transmitting frequencies of television stations in that area. An electric motor 16 is provided which is mounted in a housing 18 by means of supporting studs 17. The housing is secured to the rear of the tuner 10 by conventional means which may include spacers 20 and a bracket attachment 21, see Figure 5. The motor shaft 22 rotatably drives the tuner shaft 14 by means of a conventional gear reduction mechanism 24 which is connected between them. A bank of switches indicated generally as 26 is connected to the housing 18 by a cable 27 for controlling the motor. Cable 27 is provided with a plurality of wires (not shown) which connect a terminal of each numbered switch in the bank of switches with a correspondingly numbered wire leading to correspondingly numbered contacts in the housing. In addition electric power lines 28, and a push button 30 are provided for energizing and starting the remote control attachment.

Figure 5:
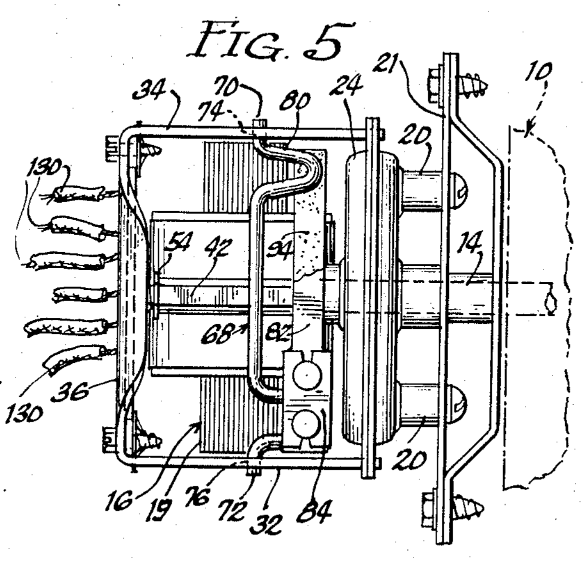
Figure 5 is a sectional view taken on the line 5—5 of Figure 3 showing the lever arm attached to the armature and its engagement with the leaf spring.
Figure 8:
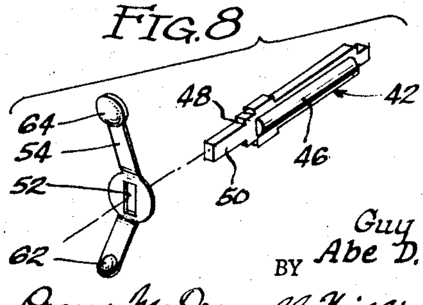
Figure 8 is a perspective view of the non-conductive shaft extension and the conductive wiper adapted to be mounted on it.

As seen in Figures 4 and 5, the housing 18 comprises side walls 32 and 34 and a rear portion 36. This rear portion is provided with an opening which is closed off by a non-conductive closure or wall 38, see Figure 2. As seen in Figure 3, the non-conductive wall is disposed perpendicularly to the tuner shaft 14 and is provided with a shaft receiving opening 40. A conductive bushing 41 is rigidly mounted in the opening 40 and provides an electric terminal 43 for both sides of the closure 38. A non-conductive shaft extension 42 is secured to the end of the tuner shaft 14 by conventional attaching means 44. The free end of the shaft extension 42 is rotatably supported in the bushing 41 in the shaft receiving opening of the closure 38. Arcuate ribs 46 are formed on the sides of the shaft extension 42 for strengthening it, and the free end of the shaft is reduced to provide a shoulder 48, see Figure 8. The reduced free end 50 of the non-conductive shaft extension is rectangular in cross section and is adapted to penetrate a corresponding opening 52 in a conductive wiper 54. This arrangement permits the conductive wiper to move back and forward longitudinally on the shaft extension, but it must rotate with the shaft. A conductive coil spring 56 is provided which is positioned on the free end 50 of the shaft extension 42. This coil spring has one end bearing against the conductive bushing 41 in the non-conductive wall 38, and the opposite end bearing against the conductive wiper 54. This forces the wiper in operative position against the shoulder 48, and provides a conductive path from the conductive bushing to the wiper, see Figure 3.

First and second groups of electrical contacts 58 and 60 are mounted in and extend through the non-conductive wall 38, see Figure 4. The first group of contacts 58 are mounted in a circle concentric with the shaft 42 and are angularly spaced in accordance with the predetermined angular positions of the tuner shaft which correspond to the receiving positions for the standard television channels. The contacts 60 in the second group are also mounted in a circle concentric with the shaft 41, and each one is angularly positioned intermediate adjacent contacts in the first group. A conductive ring 66 is provided on the outer surface of the non-conductive wall to provide a common connection for all contacts in the second group, see Figure 2. The wiper 54 is mounted on the shaft 42, so one end 62 slidably engages only the contacts in the first group, and the opposite end 64 slidably engages only the contacts in the second group. The size of the contacts in both groups and the size of the ends 62 and

64 of the wiper and the spacing between the contacts are all adjusted so there is a continuous path for electric current from the conductive wiper through a contact in either the first or second group or both.

Figure 6:
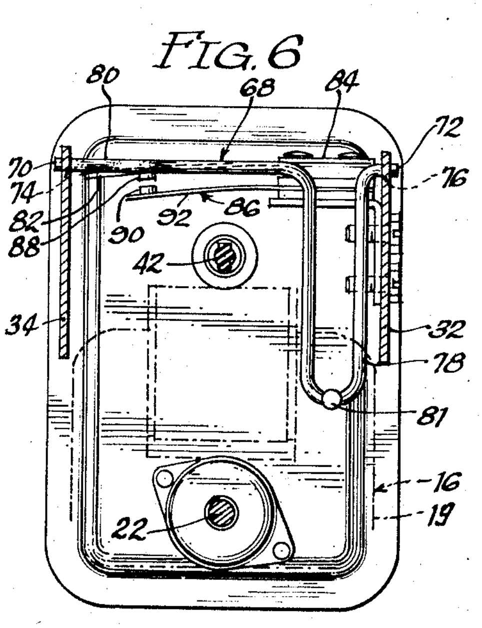
Figure 6 is a sectional view taken on the line 6—6 of Figure 3 showing other details of the armature and the automatic disconnect switch for the remote control attachment.
Figure 7:
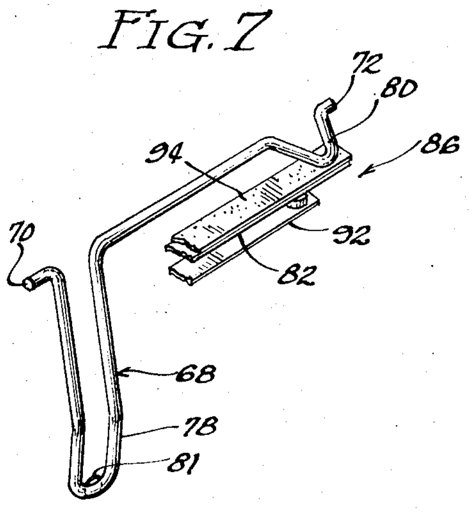
Figure 7 is a perspective view of the armature and its attached lever arm in operative association with the disconnect switch.

An armature 68 having oppositely extending pintles 70 and 72, see Figure 7, is pivotally supported in the pintle receiving openings 74 and 76 in the side walls 32 and 34 of the housing 18, see Figure 5. The armature is formed from a single piece of magnetically responsive wire and has one looped portion 78 extending substantially parallel to a surface of the iron body 19 of the motor, see Figure 3. Another looped portion 80 comprising a lever arm extends in a plane substantially perpendicular to the plane of looped portion 78. A leaf spring 82 is mounted at one end in the housing by conventional mounting means 84, see Figure 6. The free end of this leaf spring engages lever arm 80 and exerts force on it, rotating the armature 68. This moves the looped portion 78 away from the iron body of the motor and against a stop 79, see Figure 3. The leaf spring 82 also carries one contact 88 of a normally open disconnect switch 86. The other contact 90 is carried by another leaf spring 92, also mounted in housing 18 by mounting means 84. Leaf spring 92 and its contact 90 are in spaced relation to leaf spring 82 and contact 88, see Figure 3. An insulating strip 94 may be provided to overlie the top surface of leaf spring 82 to insulate the armature. In operation to this point, when the motor is energized its magnetic field overcomes the bias of leaf spring 82 on the armature and draws the looped portion 78 to it. This rotates the armature and forces lever arm 80 against the disconnect switch thereby closing it. To prevent the end of the looped portion 78 from becoming magnetized and sticking to the iron body 19 of the motor, a non-magnetic tip 81 made of silver or some like metal may be employed.

Referring now to Figures 9–14, a bank of switches indicated generally as 26 are mounted in a substantially rectangular metallic housing 98. A wall sized rectangular opening is provided on one side of the housing, and this opening is closed off by a non-conductive substantially rectangular closure 100, see Figures 11 and 13. The non-conductive closure is provided with mounting tabs 102 which are adapted to penetrate correspondingly shaped slots 104 in wall 106 of the housing 98, see Figures 12 and 13. It is also held in position in the housing by means of metallic tabs 110 which are integral with the sides of the housing and which are bent over to hold the closure in place, see Figure 11. A mounting flange 108 forming an integral extension of the wall 106 permits the housing 98 to be mounted on any convenient supporting surface, see Figure 13. A plurality of uniformly spaced conductive terminals 112 extend through the closure 100, see Figures 11 and 13. In addition, an elongated resilient conductive strip 114 supported by an elongated angle member 116 is mounted on the non-conductive closure inside the housing. The resilient conductive strip has a plurality of uniformly spaced parallel resilient conductive fingers 118 integrally formed with it, one finger for each conductive terminal 112. Each of these fingers is bent at 119 forming a V-shaped projection, see Figures 13 and 14, and the free end 120 of these fingers is normally in spaced relation directly over one of the conductive terminals 112.

Figure 9:
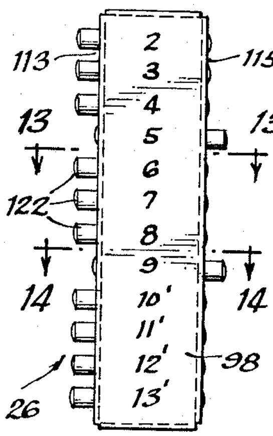
Figure 9 is a front view of the portable bank of control switches.
Figure 10:
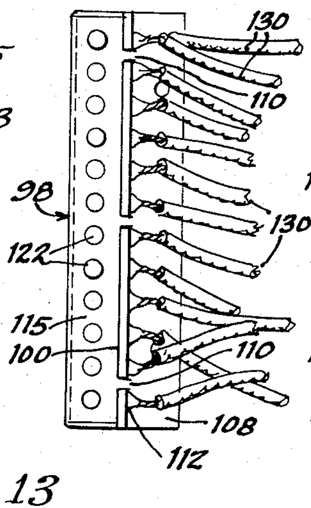
Figure 10 is a right side view of the portable bank of switches.
Figure 11:
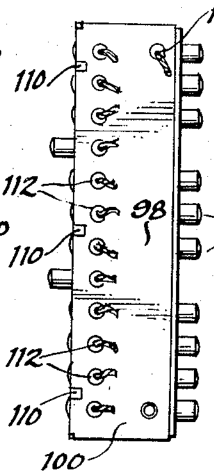
Figure 11 is a rear view of the portable bank of control switches.
Figure 12:
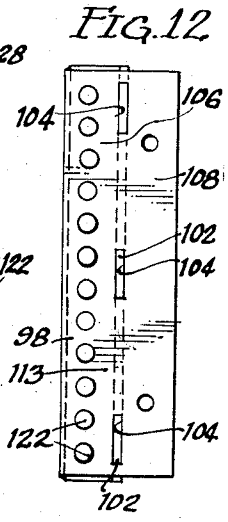
Figure 12 is a left side view of the portable bank of switches with the mounting flange exposed.
Figure 13:
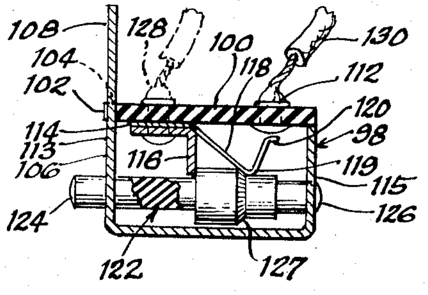
Figure 13 is a sectional view taken on the line 13—13 of Figure 9 showing the position of one of the push buttons in the bank of switches, with the switch in open position.
Figure 14:
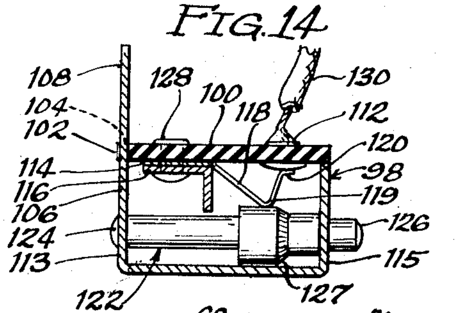
Figure 14 is a sectional view taken on the line 14—14 of Figure 9 showing the position of one of the push buttons in the bank of switches with the switch in closed position.

The housing is also provided with a plurality of uniformly spaced aligned openings in the opposite walls 113 and 115, see Figure 9. Push buttons 122 having opposed ends 124 and 126 are mounted in these openings, see Figures 13 and 14. Each push button has a finger engaging cam surface 127, and when end 124 of the push button is pressed, the cam engaging surface engages the bent portion 119 of one of the fingers 118 and forces its free end 120 into contact with one of the conductive terminals 112, see Figure 14. When the opposite end 126 is pressed, the cam surface is moved in a direction which permits the free end 120 of the finger 118 to break engagement with the contact 112, see Figure 13. A contact 128 engaging the resilient conductive strip 114 provides a common terminal for all the switches in the bank. Each conductive terminal 112 is connected to one of the contacts 58 in the first group on housing 18 by a wire 130 in the connecting cable 27 for purposes to be described below, see Figure 10.

Figure 15:
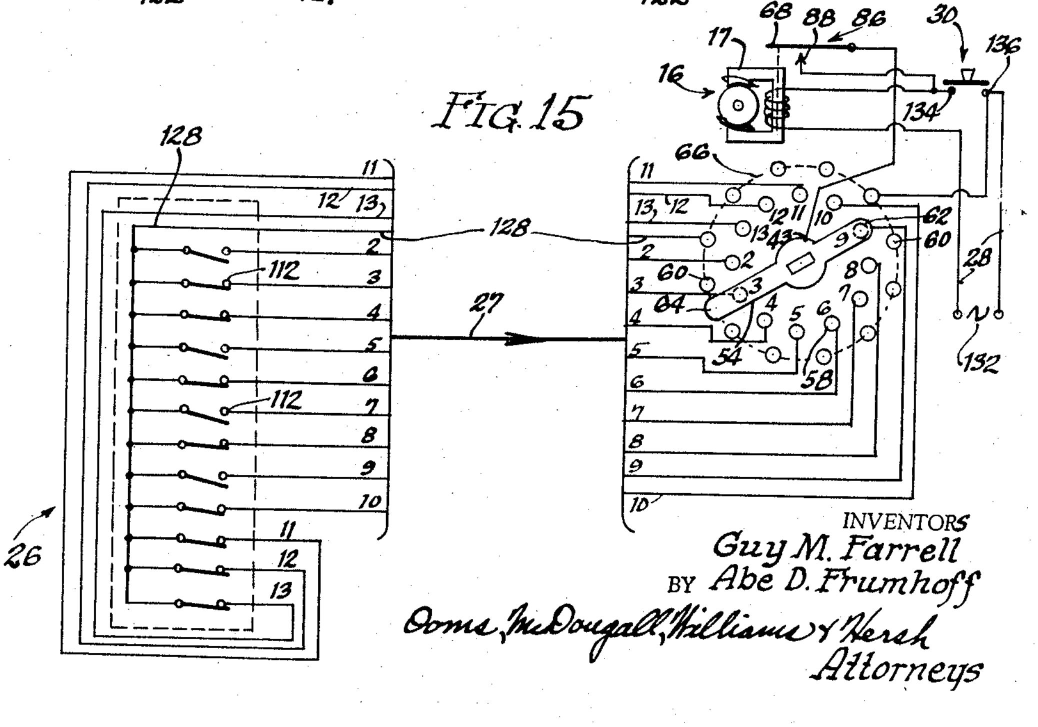
Figure 15 is a circuit diagram of the remote control attachment.

Referring now to the circuit diagram in Figure 15 for an understanding of the operation of this remote control mechanism, power is supplied to the motor 16 from a source 132 through power lines 28. It is evident that when the push button 30 is closed the motor will operate and this will rotate the tuner shaft 14. When the motor starts, the magnetic field it produces will attract the armature 68 and close the disconnect switch 86. One contact 88 of this switch is connected to terminal 134 of the push button 30, so when switch 86 is closed current will flow through contact 43 in the non-conductive wall 38 and on into the conductive wiper 54. As seen in Figure 15, end 62 of the wiper is initially in contact with contact numbered 9. This corresponds to a tuner shaft position for receiving channel 9 on the television set. This contact is connected to switch 9 in the bank of switches 26, which happens to be open. As seen in Figure 9, numbers may be provided on the housing 98 which are associated with each switch for ease in identifying them.

When push button 30 is momentarily closed, the wiper 54 will start to move off contact 9 and when this happens the end 64 of the wiper 54 will engage one of the contacts 60 in group 2. This group is part of a carry-over circuit and has been provided to keep the motor operating after the push button is released. They operate in this way. As stated above, all the contacts in group 2 are connected together by a conductive ring 66, and as seen in Figure 15, this conductive ring is connected to the other terminal 136 of the push button. Therefore, so long as the conductive wiper 54 engages any contact 60 in group 2, the push button is bypassed and the motor will continue to operate. If in the example shown, the motor is assumed to rotate in the counterclockwise direction, continued rotation of the motor will soon move end 62 of the wiper exactly over contact number 10 while end 64 of the wiper is exactly between adjacent contacts 60 in group 2. Referring to the bank of switches 26, it can be seen that switch 10 is closed and the common terminal 128 is connected to the conductive ring 66 and to terminal 136 of the push button, providing thereby an alternative path bypassing the push button. Hence the motor will continue to operate until the end 62 of the wiper comes to a contact 58 in group 1 whose switch in bank 26 is open. In Figure 15, this will happen when the wiper comes to contact 2. When this occurs, all paths for the current through the motor by-passing push button 30 are broken and the motor will stop. When the motor stops, its magnetic field is cut off, and this releases the armature 68 and permits it to move away from the motor under the force exerted by the leaf springs 82 and 92. This movement lets the disconnect switch 86 open.

This arrangement is very important, because it automatically disconnects the remote control mechanism from the television tuner each time the motor stops, and this permits manual operation of the set to be resumed. Without this switching arrangement, if a person were to try to manually change the stations by turning the tuning knob 12, the remote control system would become actuated and would move the tuner shaft to the next contact with an open switch in the bank and it is clear that the disconnect switch could be left out where manual operation of the set is not desirable. In such a case the conductive wiper would be directly connected to one of the terminals of the push button.

It is evident that this remote control mechanism which is actuated by momentarily closing push button 30 lends itself to other obvious variations. For example, the push button 30 can itself be actuated by a sound signal, or light or radio frequency waves when connecting wires are objectionable. In such a case it is very advantageous that the signal to the push button need not be transmitted for the entire period the tuner is changing stations. In addition, the fact that the stations can be automatically changed by merely pressing a push button permits this remote control attachment to be used by handicapped people.

It is apparent that this remote control attachment can be easily operated to tune to any standard television channel by merely opening the switches in bank 26 whose contacts 58 are disposed at the angular position around the tuner shaft 14 which correspond to the desired stations. Furthermore, this attachment works without supervision. This is important in places where stations on large numbers of television sets have to be frequently changed and the time of the employees is an important consideration. In addition, this remote control attachment can be set to automatically exclude stations whose programs may be injurious to the viewers. Besides this, when the television sets are transported from one geographical area to another, the remote control attachment can be quickly adjusted so the tuner stops only at the transmitting channels in that area.

This remote control attachment also lends itself well to simultaneous and synchronous tuning of large numbers of television sets. This would be particularly useful in public places or in television sales departments where there are large numbers of sets and for purposes of comparison it may be desirable to change the stations on all the sets at the same time. This could be easily done if all the television sets had this kind of remote control attachment. It would then be only necessary to connect all the sets in parallel to a single bank of switches and to a single push button. Then when the push button was momentarily pressed all the sets would automatically turn to the next selected station.

The invention may be embodied in other forms without departing from the spirit or essential characteristic thereof as set forth in the claims, and the present embodiment therefore is considered as illustrative and not restrictive, and it is intended to include all changes which come within the scope and range of the claims.

We claim:

1. An apparatus of the class described comprising in combination a station selector of the class wherein stations are selected by moving an element through a plurality of predetermined positions, at least some of said predetermined positions corresponding to desired stations, and means for automatically driving said station selector from one desired station to the next from a point remote from the station selector, said means comprising an electric motor, said motor connected to said element for driving it through the plurality of positions, an electric power source, power lines connecting said electric power source to said motor, a normally open hold-down switch adapted to be actuated from a point remote from the station selector, said hold-down switch in one power line intermediate said power source and said electric motor for starting the motor, means for by-passing the hold-down switch and keeping the motor going after the hold-down switch is released, said means comprising a bank of switches, each of said switches having a contact, said contacts spaced in accordance with the predetermined positions of said element, a conductive wiper movable with said element and adapted to engage each of said contacts, means connecting one of the terminals of said hold-down switch with said wiper, each of said contacts when the corresponding switch in said bank is closed providing a path for the electric current to the other terminal of the hold-down switch to by-pass it, predetermined switches in said bank left open, said switches having contacts at the predetermined positions in the station selector corresponding to the desired stations so that upon momentarily pressing down said hold-down switch, the motor will drive said element and said wiper past all intermediate positions until the wiper comes to the contacts of these predetermined open switches where the circuit is broken causing the motor to stop.

2. The apparatus set forth in claim 1 wherein said bank of switches comprises a housing, said housing having an opening therein, a non-conductive closure for said housing opening, a plurality of spaced conductive terminals extending through the closure, a conductive strip mounted on said closure inside the housing, a plurality of spaced resilient conductive fingers secured to said conductive strip, one finger for each of said conductive terminals, and in spaced relation therewith, spaced push buttons in said housing, one for each of said resilient conductive fingers, each of said push buttons having a finger engaging surface thereon, said finger engaging surface positioned to engage one of the resilient conductive fingers and force it into contact with one of the conductive terminals when the push button is moved in one direction, said finger engaging surface moving away from the finger and permitting it to break contact with the conductive terminal when the push button is moved in the opposite direction, each of said spaced conductive terminals connected to one of said contacts, said flexible conductive strip comprising a common terminal and connected to said other terminal of said hold-down switch.

3. An apparatus of the class described comprising in combination a station selector of the class wherein stations are selected by manually moving an element through a plurality of predetermined positions, at least some of said predetermined positions corresponding to desired stations, and automatic driving means for automatically driving said station selector from one desired station to the next from a point remote from the station selector, said means comprising an electric motor, said motor connected to said element for driving it through the plurality of positions, an electric power source, power lines connecting said electric power source to said motor, a normally open hold-down switch adapted to be actuated from a point remote from the station selector, said hold-down switch in one power line intermediate said power source and said electric motor for starting the motor, means for by-passing the hold-down switch and keeping the motor going after the hold-down switch is released, said means comprising a bank of switches, each of said switches having a contact, said contacts spaced in accordance with the predetermined positions of said element, a conductive wiper movable with said element adapted to engage each of said contacts, means connecting one of the terminals of said hold-down switch with said wiper, each of said contacts when the corresponding switch in said bank is closed providing a path for the electric current to the other terminal of the hold-down switch to by-pass it, predetermined switches in said bank left open, said switches having contacts at the predetermined positions in the station selector corresponding to the desired stations, so that upon momentarily closing said hold-down switch, the motor will drive said element and said wiper past all intermediate positions until the wiper comes to the contacts of these predetermined open switches, thereby breaking the circuit, and causing the motor to stop, and means for disconnecting a portion of said automatic driving means from said station selector to permit manual operation thereof.

4. The apparatus set forth in claim 3 wherein said means for disconnecting a portion of said automatic driving means from said station selector comprises an electric switch, said electric switch positioned in the circuit and adapted to interrupt the current flow through said conductive wiper.

5. The apparatus set forth in claim 3 wherein said means for disconnecting a portion of said automatic driving means from said station selector comprises a normally open electric switch, said switch positioned in the circuit and adapted to interrupt the current flow through the conductive wiper, said switch connected to said motor so that operation of the motor closes said switch, said switch remaining closed only while said motor is operating whereby the automatic driving means becomes effective only after the electric motor is momentarily started and becomes automatically disconnected from said station selector after the motor stops permitting manual operation to be resumed.

6. The apparatus set forth in claim 3 wherein said means for disconnecting a portion of said automatic driving means from said station selector comprises a normally open electric switch positioned in the circuit, and adapted to interrupt the current flow through the conductive wiper, said switch responsive to a magnetic field and adapted to be closed by the magnetic field of the operating motor, said switch remaining closed only while the motor is operating whereby the automatic driving means becomes effective only after the electric motor is momentarily started and becomes automatically disconnected from said station selector after the motor stops, permitting manual operation to be resumed.

7. The apparatus set forth in claim 3 wherein said bank of switches comprises a housing, said housing having an opening therein, a non-conductive closure for said housing opening, a plurality of spaced conductive terminals extending through the closure, a conductive strip mounted on said closure inside the housing, a plurality of spaced resilient conductive fingers secured to said conductive strip, one finger for each of said conductive terminals and in spaced relation therewith, spaced aligned openings in said housing, push buttons reciprocably mounted in said openings, said push buttons having opposed ends projecting out of the housing, each of said push buttons having a finger engaging surface, said finger engaging surface positioned to engage one of the resilient conductive fingers and force it into contact with one of the conductive terminals when one projecting end of the push button is pressed, said finger engaging surface moving away from the finger and permitting it to break contact with the conductive terminal when the other projecting end of the push button is pressed, each of said spaced conductive terminals connected to one of said contacts, said flexible conductive strip comprising a common terminal and connected to said other terminal of said hold-down switch.

8. An apparatus of the class described comprising in combination a station selector wherein stations are selected by manually rotating a shaft through a plurality of predetermined angular positions, at least some of said predetermined angular positions corresponding to desired stations, and automatic driving means for automatically driving said station selector from one desired station to the next from a point remote from the station selector, said means comprising an electric motor, said motor connected to said shaft for rotating it through the plurality of predetermined positions, an electric power source, power lines connecting said electric power source to said motor, a normally open hold-down switch adapted to be actuated from a point remote from the station selector, said hold-down switch in one power line intermediate said power source and said electric motor for starting the motor, means for by-passing the hold-down switch and keeping the motor going after the hold-down switch is released, said means comprising a bank of switches, each of said switches having a contact, said contacts angularly spaced about said shaft in accordance with said predetermined angular positions, at least one conductive wiper rotatable with said shaft, said wiper adapted to sequentially engage said contacts, means connecting one of the terminals of said hold-down switch with said wiper, each of said contacts, when the corresponding switch is closed, providing a path for the electric current to the other terminal of the hold-down switch to by-pass it, predetermined switches in said bank left open, said open switches having contacts at the predetermined angular positions about the shaft of the station selector corresponding to the desired stations, so that upon momentarily closing said hold-down switch, the motor will rotate said shaft and said wiper past all intermediate angular positions until the wiper comes to the contacts of these predetermined open switches thereby breaking the circuit and causing the motor to stop, and means for disconnecting a portion of said automatic driving means from said station selector to permit manual operation.

9. The apparatus set forth in claim 8 wherein said means for disconnecting a portion of said automatic driving means from said station selector comprises a normally open electric switch, said switch positioned in the circuit and adapted to interrupt the current flow through the conductive wiper, said switch connected to said motor so that operation of the motor closes said switch, said switch remaining closed only while said motor is operating whereby the automatic driving means becomes effective only after the electric motor is momentarily started, and automatically becomes disconnected from said station selector after the motor stops, permitting manual operation of the station selector to be resumed.

10. The apparatus set forth in claim 8 wherein said means for disconnecting a portion of said automatic driving means from said station selector comprises a normally open electric switch positioned in the circuit and adapted to interrupt the current flow through the conductive wiper, said switch responsive to a magnetic field and adapted to be closed by the magnetic field of the operating motor, said switch remaining closed only while the motor is operating whereby the automatic driving means becomes effective only after the electric motor is momentarily started, and becomes automatically disconnected from said station selector after the motor stops, permitting manual operation of the station selector to be resumed.

11. The apparatus set forth in claim 8 wherein said bank of switches comprises a substantially rectangular housing, said housing having an opening therein, a non-conductive closure for said housing opening, a plurality of uniformly spaced conductive terminals extending through the closure, a resilient conductive strip mounted on said closure inside the housing, said conductive strip having a plurality of uniformly spaced parallel resilient conductive fingers, each of said fingers bent to be V-shaped in cross-section, with the free end in spaced relation to one of the conductive terminals, uniformly spaced aligned openings in said housing, push buttons reciprocably mounted in said aligned openings in spaced parallel relationship, said push buttons having opposed ends projecting out of the housing, each of said push buttons having a finger engaging cam surface, said finger engaging cam surface positioned to engage the bent portion of said fingers and force the free end into contact with one of the conductive terminals when one projecting end of the push button is pressed, said finger engaging surface moving away from the finger and permitting it to break contact with the conductive terminal when the other projecting end of the push button is pressed, each of said spaced conductive terminals connected to one of said contacts, said flexible conductive strip comprising a common terminal and connected to said other terminal of said hold-down switch.

12. An apparatus of the class described comprising in combination a televison tuner wherein television stations are selected by manually rotating a tuner shaft through a plurality of predetermined angular positions, at least some of said predetermined angular positions corresponding to desired stations, and means for automatically driving said tuner from one desired station to the next from a point remote from the television tuner, said means comprising a housing, said housing secured to said television tuner, an electric motor mounted in said housing, said electric motor connected to said tuner shaft for rotating it through the plurality of predetermined stations, said housing having a non-conductive wall, said non-conductive wall perpendicular to the tuner shaft, said tuner shaft having an attached non-conductive extension, said non-conductive wall having a shaft supporting opening, the end of said non-conductive tuner shaft extension rotatably supported in said opening, first and second groups of electrical contacts mounted in said non-conductive surface, said first group of contacts mounted in a circle concentric with said shaft and angularly spaced in accordance with the predetermined angular positions of the tuner shaft, said second group of contacts mounted in a circle in radially spaced relation to said first group of contacts, each contact in said second group angularly positioned intermediate adjacent contacts in said first group, all contacts in said second group connected to a common terminal, a conductive wiper mounted on the end of said non-conductive shaft extension and rotatable therewith, one end of said conductive wiper adapted slidably to engage the contacts in said first group, and the other end adapted to slidably engage the contacts in the second group, the size of the ends of the conductive wiper, the size of the contacts and the spacing between them adjusted so there is a continuous path for electric current from the conductive wiper through a contact in either the first or second group, an electric power source, power lines connecting said electric power source to said motor, a normally open push button switch in one power line intermediate said power source and said electric motor for starting the motor, said push button switch adapted to be actuated from a point remote from the television tuner, and means for by-passing the push button switch and keeping the motor going after the push button switch is released, said means comprising a bank of switches, each of said switches having one terminal connected to one of the contacts in said first group, each switch in said bank of switches having a terminal connected to said common terminal, said common terminal adapted to be connected to one terminal of the push button switch, the other terminal of said push button switch connected to said conductive wiper, predetermined switches in said bank left open, said switches having contacts in said first group at the predetermined angular positions corresponding to the desired stations so that upon momentarily closing said push button switch, the motor will rotate said shaft and said wiper past all intermediate angular positions until the wiper comes to the contact of the next open switch, thereby breaking the circuit and causing the motor to stop, and means for automatically disconnecting a portion of said automatic driving means from said tuner, whenever the motor stops, to permit manual operation of the tuner.

13. The apparatus set forth in claim 12 wherein said bank of switches comprises a substantially rectangular housing, said housing having an opening therein, a non-conductive closure for said housing opening, a plurality of uniformly spaced conductive terminals extending through the closure, a resilient conductive strip mounted on said closure inside the housing, said conductive strip having a plurality of uniformly spaced parallel resilient conductive fingers, each of said fingers bent to be V-shaped in cross section with the free end in spaced relation to one of the conductive terminals, uniformly spaced aligned openings in said housing, push buttons reciprocably mounted in said aligned openings in spaced parallel relationship, said push buttons having opposed ends projecting out of the housing, each of said push buttons having a finger engaging cam surface, said finger engaging cam surface positioned to engage the bent portion of said fingers and force the free end into contact with one of the conductive terminals when one projecting end of the push buttons is pressed, said finger engaging cam surface moving away from the finger and permitting it to break contact with the conductive terminal when the other projecting end of the push button is pressed, each of said spaced conductive terminals connected to one of said contacts, said flexible conductive strip connected to said common terminal.

14. The apparatus set forth in claim 12 wherein said means for automatically disconnecting a portion of said driving means from said tuner comprises an armature and a normally open disconnect switch, said disconnect switch comprising spaced leaf springs mounted at one end in the housing, one terminal of said disconnect switch connected to one terminal of said push button and the other terminal connected to said conductive wiper, said armature pivotally mounted in the housing and including a motor engaging portion and a lever arm, said lever arm engaged by one of said leaf springs whereby the armature is rotated and said motor engaging portion is moved away from the motor, said motor developing a magnetic field while operating which exerts an attractive force on said armature stronger than the bias exerted by said leaf spring so that the armature is rotated in the opposite direction forcing the lever arm against said one leaf spring and moving it into engagement with the other leaf spring to close the switch so that a portion of the automatic driving means is connected into the circuit when the motor starts and it becomes automatically disconenected when the motor stops.

15. An apparatus of the class described comprising a shaft, a non-conductive extension secured to said shaft, a non-conductive wall, said non-conductive wall perpendicular to said non-conductive shaft extension and having a shaft supporting opening therein, the free end of said non-conductive extension rotatably mounted in said opening, a shoulder provided on said shaft adjacent said free end, a conductive wiper mounted on and rotatable with said non-conductive extension, said conductive wiper positioned between said free end and said shoulder, means acting between said conductive wiper and said non-conductive extension to permit only longitudinal movement of said conductive wiper with respect to said non-conductive extension, an electric terminal adjacent said opening in said non-conductive wall, a conductive coil spring mounted on said non-conductive wall, one end of said conductive coil spring bearing against said electric terminal, and the opposite end bearing against said conductive wiper holding said wiper against said shoulder and providing a conductive path from said terminal to said wiper.

References Cited in the file of this patent

UNITED STATES PATENTS

| | | |
|---|---|---|
| 1,656,627 | Giebel | Jan. 17, 1928 |
| 2,267,135 | Roberts | Dec. 23, 1941 |
| 2,476,673 | May et al. | July 19, 1949 |